(12) United States Patent
Haas

(10) Patent No.: US 7,190,129 B1
(45) Date of Patent: Mar. 13, 2007

(54) SYSTEM AND METHOD FOR DRIFT COMPENSATION WHEN USING PULSE COUNT CONTROLLED MOTORS

(75) Inventor: Frank J. Haas, Northville, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 11/300,127

(22) Filed: Dec. 14, 2005

(51) Int. Cl.
*H02K 27/20* (2006.01)

(52) U.S. Cl. .................. 318/245; 388/828; 388/904

(58) Field of Classification Search .......... 318/244, 318/245, 461, 463; 388/828, 902–904, 912
See application file for complete search history.

(56) References Cited

U.S. PATENT DOCUMENTS

| | | | |
|---|---|---|---|
| 3,346,725 A | 10/1967 | Allured et al. | |
| 4,223,261 A * | 9/1980 | White | 318/721 |
| 4,788,497 A | 11/1988 | Katsumura | |
| 5,048,115 A * | 9/1991 | Venturino | 388/815 |
| 5,497,326 A * | 3/1996 | Berland et al. | 701/36 |
| 5,524,168 A | 6/1996 | Macks et al. | |
| 5,798,624 A | 8/1998 | Wilke et al. | |
| 6,040,668 A * | 3/2000 | Huynh et al. | 318/471 |
| 6,078,154 A | 6/2000 | Manlove et al. | |
| 6,144,179 A | 11/2000 | Kessler et al. | |
| 6,243,635 B1 * | 6/2001 | Swan et al. | 701/49 |
| 6,262,546 B1 | 7/2001 | Draves et al. | |
| 6,380,757 B1 | 4/2002 | Draves et al. | |
| 6,437,533 B1 | 8/2002 | Du et al. | |
| 6,747,424 B1 * | 6/2004 | Malik et al. | 318/254 |

* cited by examiner

*Primary Examiner*—Bentsu Ro
(74) *Attorney, Agent, or Firm*—Dickinson Wright PLLC

(57) ABSTRACT

A system of detecting position drift in the motor due to lost pulses. Due to imperfections in the motor, the timing of the commutation pulses is not uniform but forms a unique repeatable signature. The system identifies lost pulses by using a pattern recognition technique on the signature of the motor commutation pulse rate. By detecting when a pulse is lost, the system can apply a correction to the pulse count. Accordingly, the real time correction of the pulse count allows for the system to operate with significantly reduced mispositioning errors. In addition, the system requires far fewer calibrations.

18 Claims, 9 Drawing Sheets

SYSTEM AND METHOD FOR DRIFT COMPENSATION WHEN USING PULSE COUNT CONTROLLED MOTORS

BACKGROUND

1. Field of the Invention

The present invention generally relates to a system for providing drift compensation to a pulse count controlled motor.

2. Description of Related Art

Pulse count motor control positioning systems are used for low cost DC motor controls. The pulses in the current caused by motor commutation are tracked by a controller. Current pulse count motor control systems tend to gradually lose track of the position of the motor due to missing or dropped pulses and due to added pulses such as those due to electrical noise. This error is known in the art as drift. The error in the pulse count can be cumulative over time such that the desired position is not achieved due to undetected mispositioning of the motor. Undetected and unrealized mispositioning causes poor performance in the end product. Best in class pulse count positioning systems, typically, lose one pulse in every ten motor movements. This could result in a sizable positioning error after just one hundred motor movements requiring frequent recalibration or homing of the system.

In view of the above, it is apparent that there exists a need for an improved system and method to control a pulse count controlled motor.

SUMMARY

In satisfying the above need, as well as overcoming the enumerated drawbacks and other limitations of the related art, the present invention provides a system for providing drift compensation of a pulse count controlled motor.

The system provides a means of detecting position drift in the motor due to missing or added pulses. Due to imperfections in the motor, the timing of the commutation pulses is not precisely uniform over one motor rotation but forms a consistent, repeatable, and unique signature for that motor. The system identifies missing pulses by using a pattern recognition technique on the signature of the motor commutation pulse rate. By detecting when a pulse is lost or mistakenly added, the system can immediately apply a correction to the pulse count. Accordingly, the real time correction of the pulse count allows for the system to operate with significantly reduced mispositioning errors. In addition, the system requires far fewer calibrations.

Further objects, features and advantages of this invention will become readily apparent to persons skilled in the art after a review of the following description, with reference to the drawings and claims that are appended to and form a part of this specification.

DETAILED DESCRIPTION

Figure 1:
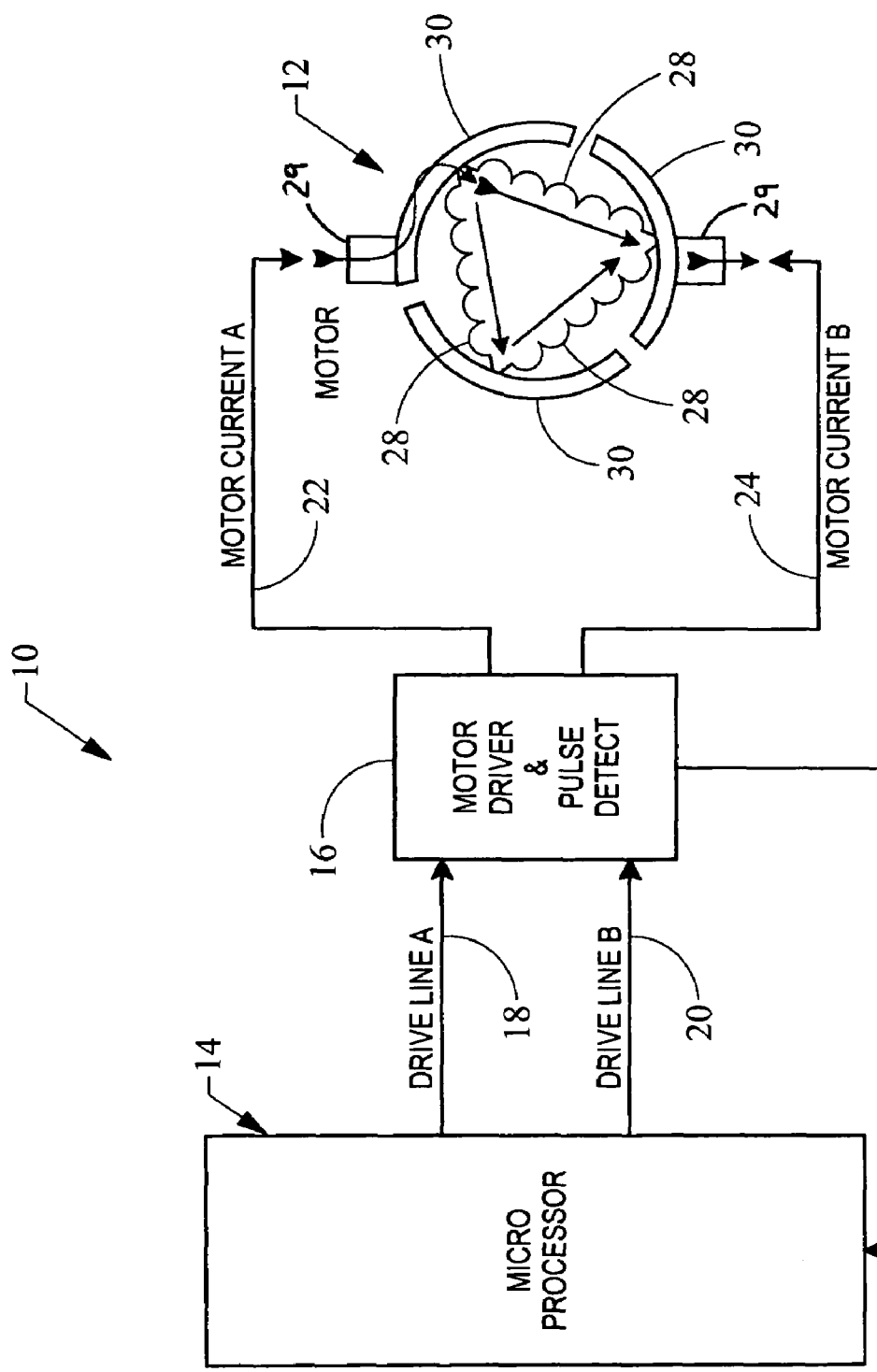
FIG. 1 is a schematic view of a system configured to provide drift compensation to a pulse count motor, in accordance with one embodiment of the present invention.

Referring now to FIG. 1, a system embodying the principles of the present invention is illustrated therein and designated at 10. The system 10 generally includes a motor 12, a processor 14, and a motor drive circuit 16. The motor 12 according to the described embodiment is a DC motor having three coils 28 in a delta configuration with three commutation segments 30. As each motor commutation brush 29 interacts with a different commutation segment 30 a commutation pulse will result. Accordingly, for one motor rotation, six distinct pulses will be generated. This is referred to in the control industry as a modulo 6 motor.

The processor 14 drives the motor 12 by providing a drive signal over driveline A 18 or driveline B 20. The motor driver circuit 16 receives the drive signals from driveline A 18 and driveline B 20 and generates a motor current signal that is provided to a first side of the motor 12 along line 22. The current path is completed along line 24 that connects the second side of the motor 12 to the motor driver circuit 16. To drive the motor 12 in a first direction, current is provided to the motor 12 along line 22 and returned along line 24. Alternatively, to drive the motor 12 in a second or opposite direction, current is provided by the motor drive circuit 16 through line 24 and returned through line 22.

Pulses in the current due to the motor commutation are converted to a voltage signal in the motor driver circuit 16 and returned to the processor 14 along line 26. The processor 14 includes a clock to time stamp each of the pulses caused by the motor commutation. Because the mechanical construction and electrical characteristics of the motor commutation brushes 29, commutation segments 30 and motor armature coils 28 are not exact, a characteristic signature of pulse spacing results. As such, the processor 14 may analyze the time period between commutation pulses and use this information to detect missing or added pulses as described later in this document.

Figure 2:
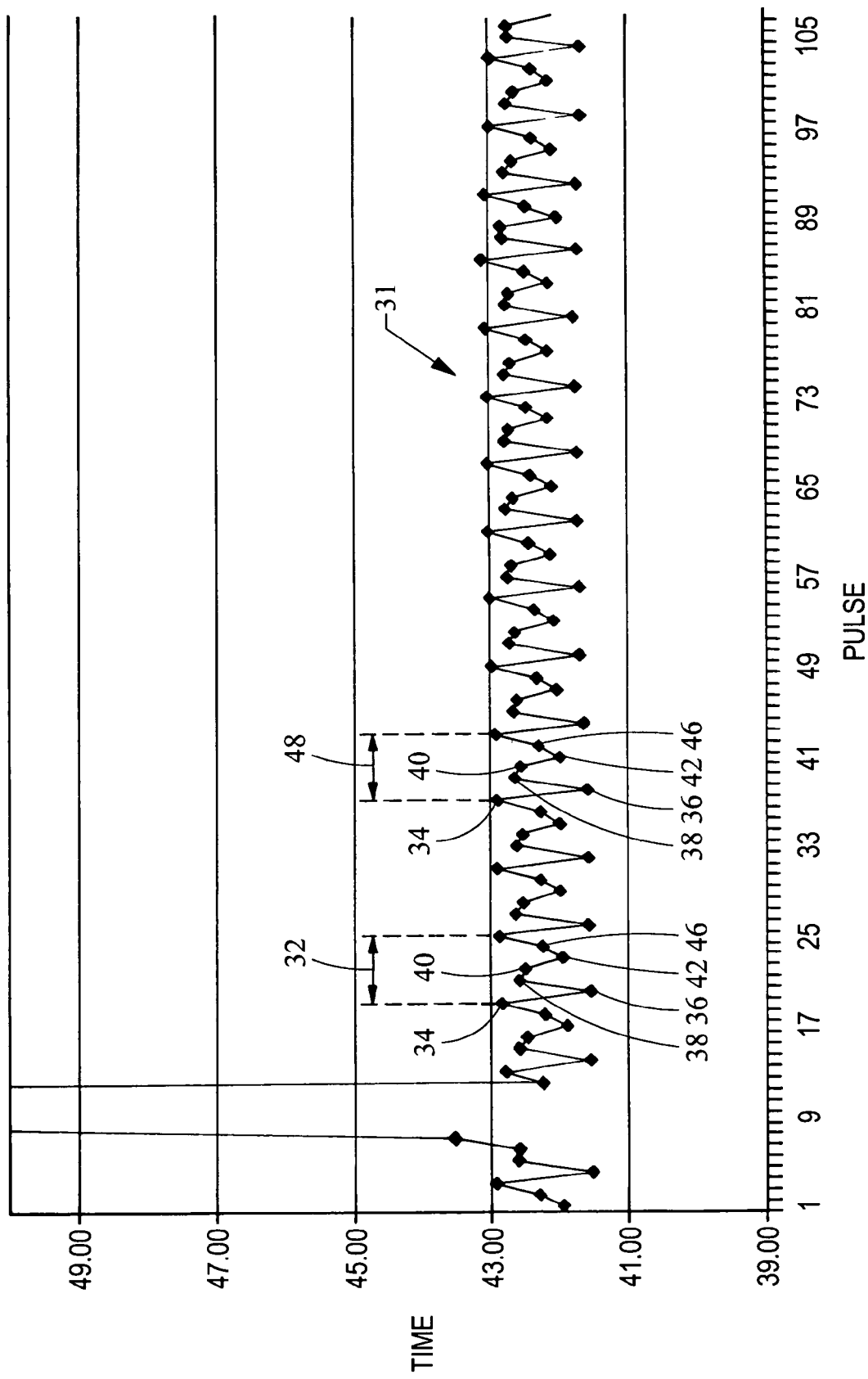
FIG. 2 is a graph illustrating the time between pulses of the current signal of the motor.

Now referring to FIG. 2, a graph is provided illustrating the time period between each commutation pulse received by the processor 14 for the motor 12. Line 31 represents the time period between each commutation pulse. Since the motor is a modulo 6 motor, the characteristic signature of pulse timing repeats every six pulses. One such signature is denoted by reference numeral 32.

The system detects this repeating signature and actively corrects for missing or inserted pulses. Further, the system re-syncs the phase of the signature after restarting the motor motion. For one rotation, the six pulses may be numbered to designate each phase of the motor commutation. Accordingly, the phase 0 is denoted by reference numeral 34. The phase 1 is denoted by reference numeral 36. Further, it can be seen that the time period of phase 1 is approximately 4.3 milliseconds. Phase 2 is denoted by reference numeral 38 and has a time period of approximately 4.25 milliseconds. Similarly, phase 3 is denoted by reference numeral 40 with a time period slightly less than phase 2. Phase 4 and phase 5 are respectively denoted by reference numeral 42 and reference numeral 46. The sequence repeats as the motor rotates and the time period of each phase maintains a consistent relationship to one another. As such, the repeating pattern can be recognized by comparing signature 32 to a subsequent signature such as signature 48.

Figure 3:
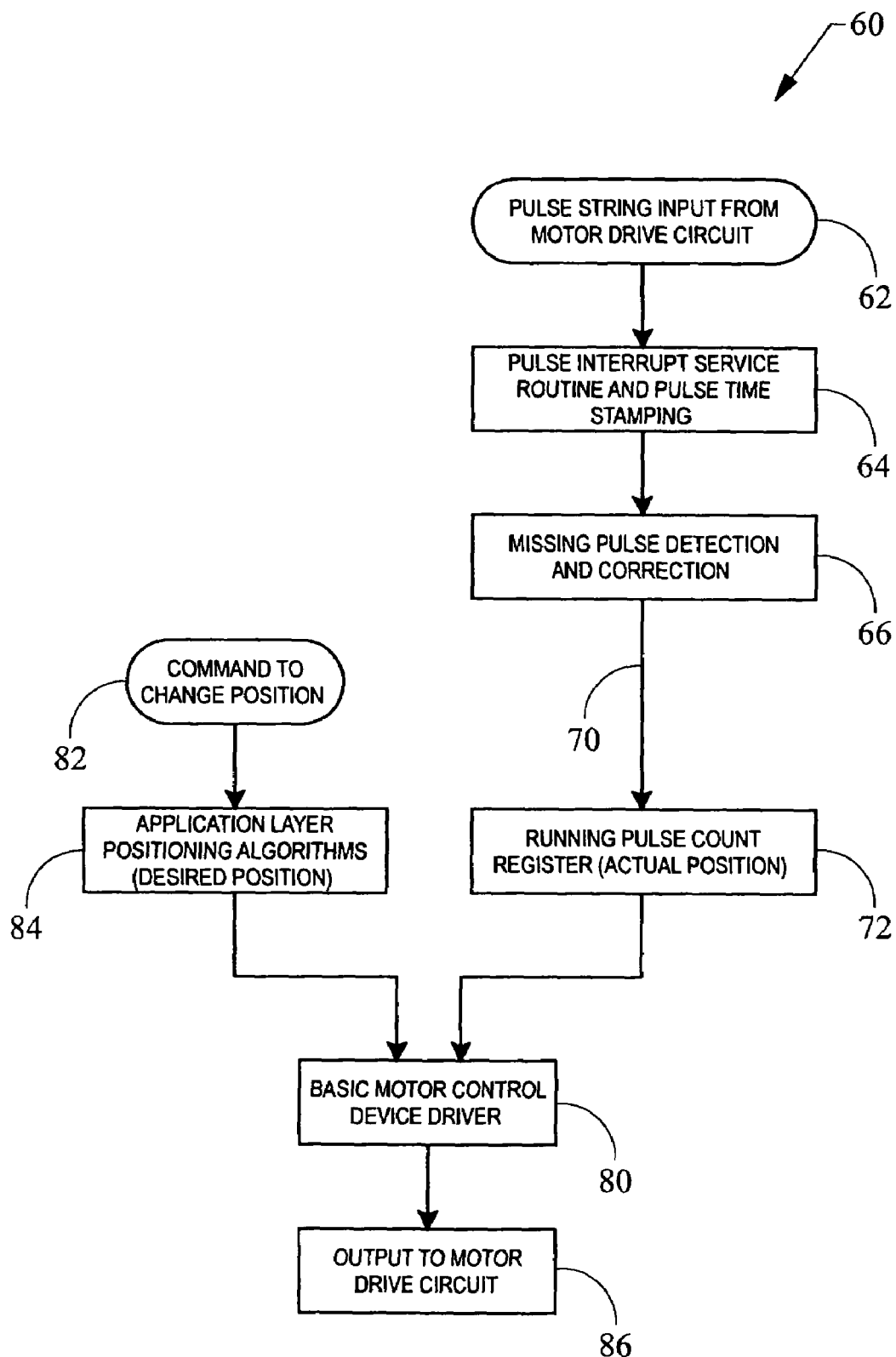
FIG. 3 is a flow chart illustrating a method for providing drift compensation to the motor.

Now referring to FIG. 3, a method 60 is provided to correct drift in the pulse count of the motor 12. In block 62, a pulse string is received in the processor 14 from the motor drive circuit 16. In block 64, a pulse interrupt service routine of the controller time stamps each pulse that is received from the motor drive circuit 16. In block 66, missing or added pulses are detected and a pulse count correction is provided along line 70 to the pulse count register 72. In block 82, a command may be initiated to change the position of the motor 12. With this command, a position algorithm determines the appropriate drive signal to provide to the motor 12, as denoted in block 84. The motor controller device driver 80 receives input from the positioning algorithm from block 84 and the pulse count register from block 72. The motor controller device driver 80, thereafter provides drive signals from the processor 14 to the motor drive circuit 16, as denoted by block 86.

Figure 4:
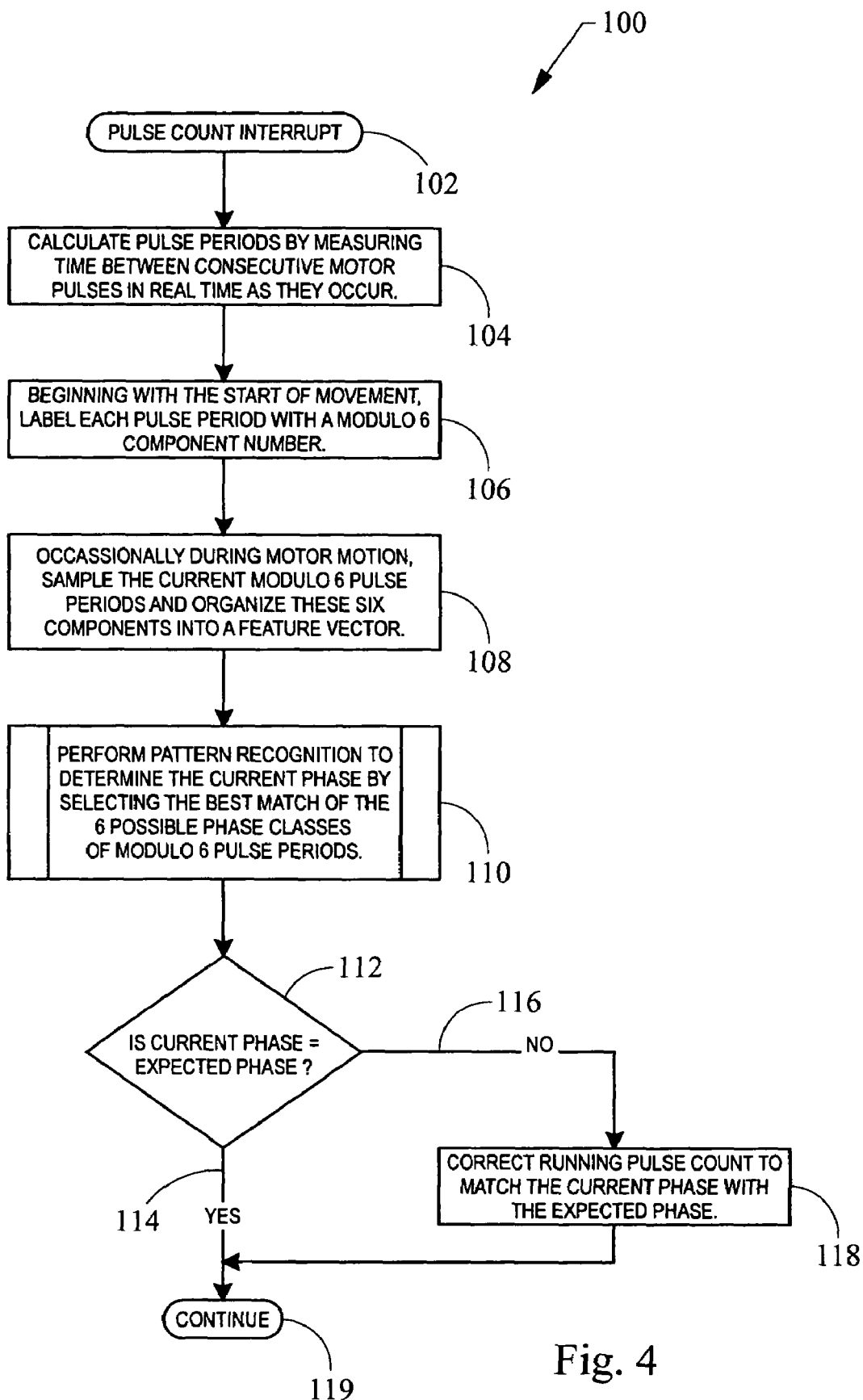
FIG. 4 is a flow chart illustrating a pulse count pattern recognition to correct for drift compensation.

As noted above, in block 66 missing pulses are detected. A method 100 for detecting missing or added pulses is provided in FIG. 4. In block 102, the pulse is received from the motor drive circuit 16 by the processor 14. In block 104, the processor calculates the pulse periods by measuring the time between consecutive commutator pulses in real time as they occur. In block 106, beginning with the start of movement, each pulse period is labeled in order corresponding to each of the six phases of the motor commutation.

In block 108, the processor organizes the pulses into a group of six pulses representing the motor signature during motor motion, as shown in Table 1 below.

TABLE 1

| PHASE | TIME PERIOD (MS) |
|---|---|
| 0 | 4.160 |
| 1 | 4.250 |
| 2 | 4.240 |
| 3 | 4.200 |
| 4 | 4.210 |
| 5 | 4.290 |

In block 110, the processor performs a pattern recognition to determine if a pulse has been missed or added by matching the six possible phases relative to the six labeled phases of the signal. In block 112, if the current phase, as determined by the pattern recognition, matches the expected phase, as determined by the consecutive numbering of pulses, the method follows along line 114 and the method ends in block 119. If the current phase is not equal to the expected phase, the logic flows along line 116 to block 118. In block 118, the signal is analyzed to determine the number of missing or added pulses by comparing the current phase to the expected phase. The number of missing or added pulses can be determined up to plus or minus two pulses in this embodiment. This limitation is because the pattern repeats every six pulses for a modulo 6 motor configuration and, therefore, if more than two pulses are skipped, the system cannot determine whether the pulses were added or missed. It should also be understood that in block 118, correction could be done immediately or a number of passes through this loop could be required to guarantee consistency of results before correction is performed. After the pulse count is corrected in block 118, the logic flows to block 119 where the method ends.

Figure 5:
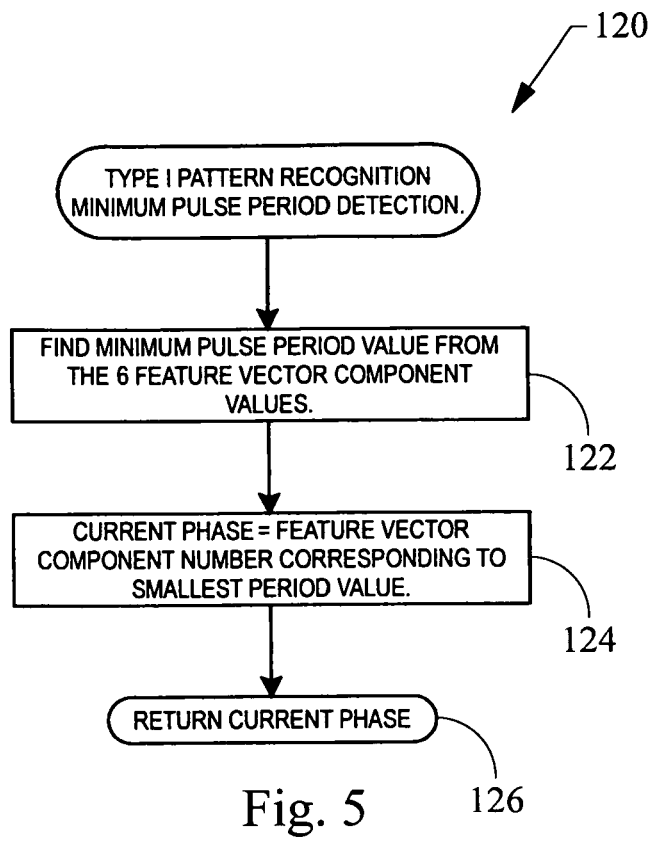
FIG. 5 is a flow chart illustrating a pattern recognition technique for identifying lost or added pulses.

Now referring to FIG. 5, one pattern recognition method 120 that identifies missing pulses is detailed therein. In block 122, the processor 14 finds the minimum pulse period value from the six phases of the pulse signature. In block 124, the processor 14 determines the number of each phase relative to the smallest period value. As such, a minimum threshold may be determined based on the time period of the phase with the smallest time period value. The processor 14 then applies a threshold to each pulse to recognize the start of the signature based on the shortest time period phase of the pulse signature. Accordingly, the method would return the current phase in block 126 based on the relationship to the latest pulse below the threshold time period. For example, the minimum time period between pulses may be determined to be about 4.16 ms. for the motor. As such, the minimum time period may be defined as phase 0, then a threshold of 4.17 ms. may be used to recognize the start of the signature. As shown in Table 2, only phase 1 is below the threshold, indicating that signature has been shifted by one pulse.

TABLE 2

| PHASE | TIME PERIOD (MS) |
|---|---|
| 0 | 4.290 |
| 1 | 4.160 |
| 2 | 4.250 |
| 3 | 4.240 |
| 4 | 4.200 |
| 5 | 4.210 |

Since the lowest time period phase happened in phase 1 rather than phase 0 where it was expected, the processor 14 can determine that one pulse has been added to the count. In addition, the same comparison may be applied using a maximum time period threshold to identify the largest time period phase. Accordingly, the processor 14 can label the phases relative to the largest time period phase.

Figure 6:
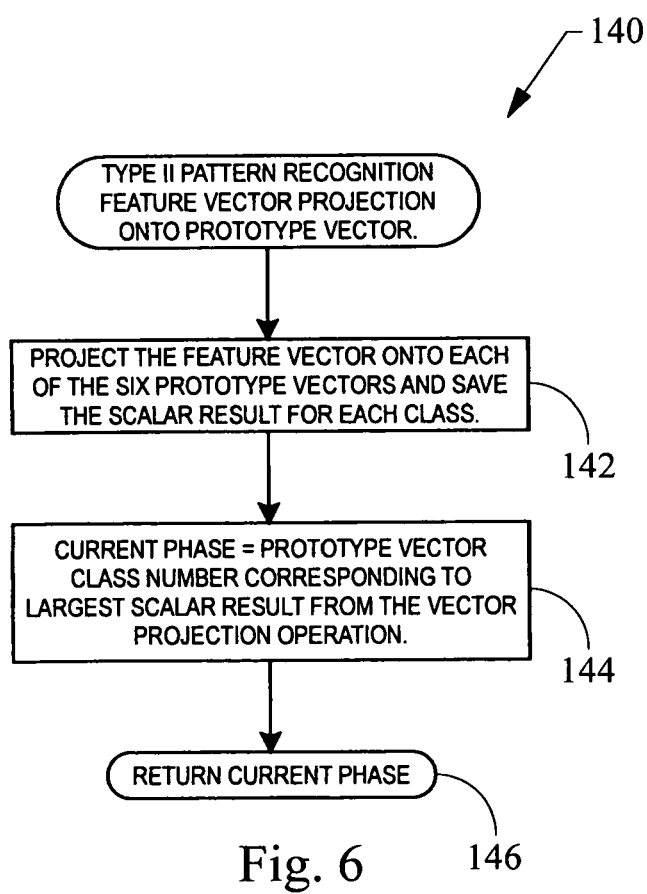
FIG. 6 is another pattern recognition technique for identifying missing or added pulses count.

Now referring to FIG. 6, another method 140 for identifying missing pulses is provided. A template or prototype vector is created based on the signature of the motor 12. The prototype vector may be construed based on a number of samples using a number of statistical techniques. For example, multiple samples may be averaged to construct the prototype vector, as shown in Table 3 below.

TABLE 3

| PHASE | SAMPLE 1 | SAMPLE 2 | SAMPLE 3 | PROTOTYPE |
|---|---|---|---|---|
| 0 | 4.288 | 4.291 | 4.291 | 4.290 |
| 1 | 4.163 | 4.159 | 4.158 | 4.160 |
| 2 | 4.250 | 4.249 | 4.251 | 4.250 |
| 3 | 4.237 | 4.241 | 4.242 | 4.240 |
| 4 | 4.202 | 4.200 | 4.198 | 4.200 |
| 5 | 4.209 | 4.209 | 4.212 | 4.210 |

In block 142, a feature vector is constructed using the time periods for the last six consecutive pulses.

The feature vector may then be compared to the prototype vector as illustrated in Table 4 below:

TABLE 4

| PHASE | PROTOTYPE | FEATURE |
|---|---|---|
| 0 | 4.290 | 4.253 |
| 1 | 4.160 | 4.241 |
| 2 | 4.250 | 4.199 |
| 3 | 4.240 | 4.210 |
| 4 | 4.200 | 4.291 |
| 5 | 4.210 | 4.159 |

The comparison may be performed by various pattern matching methods including taking the variance between the vectors, performing a best fit algorithm on the vectors, performing a correlation calculation, or performing a vector projection. In this embodiment, the feature vector is projected onto the prototype vector as denoted by block 144. The prototype vector class number corresponding to the largest scalar result is returned as the current phase, as denoted by block 146. Such a comparison provides an indication of the correlation of the number in each of the phases to the prototype vector. Since all the vectors are of unit length equal to one, the scalar number of each projection is an indication of the angle between the projected vectors, the smallest angle corresponding to the closest correlation of the feature vector to the prototype. Then, the prototype is rotated such that phase zero becomes phase one, phase one becomes phase two, and so on until phase five is assigned to phase zero. The projection of the feature vector onto this new prototype vector is performed and the scalar result is calculated again. Each rotation of the prototype vector is referred to as a different vector class. The sequence is repeated until the prototype vector has been rotated through each of the six phase combinations or vector classes. As such, the rotation with the scalar value indicating the best match is identified as the correct match to the feature vector. Accordingly, the number of missing pulses can be determined according to the shift number of the best matching prototype vector.

Figure 7A:
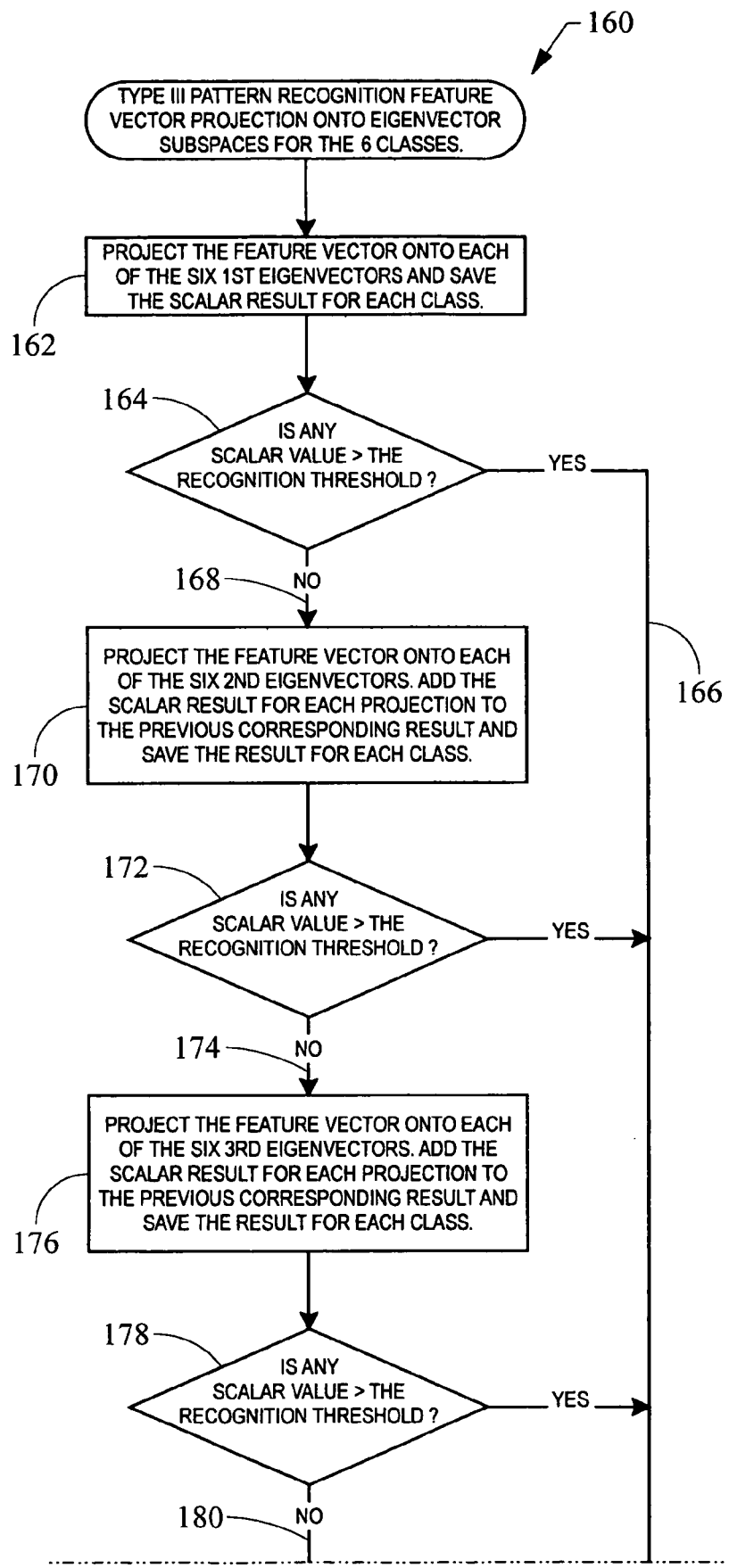
FIG. 7 is yet another pattern recognition technique for identifying missing or added pulses.
Figure 7B:
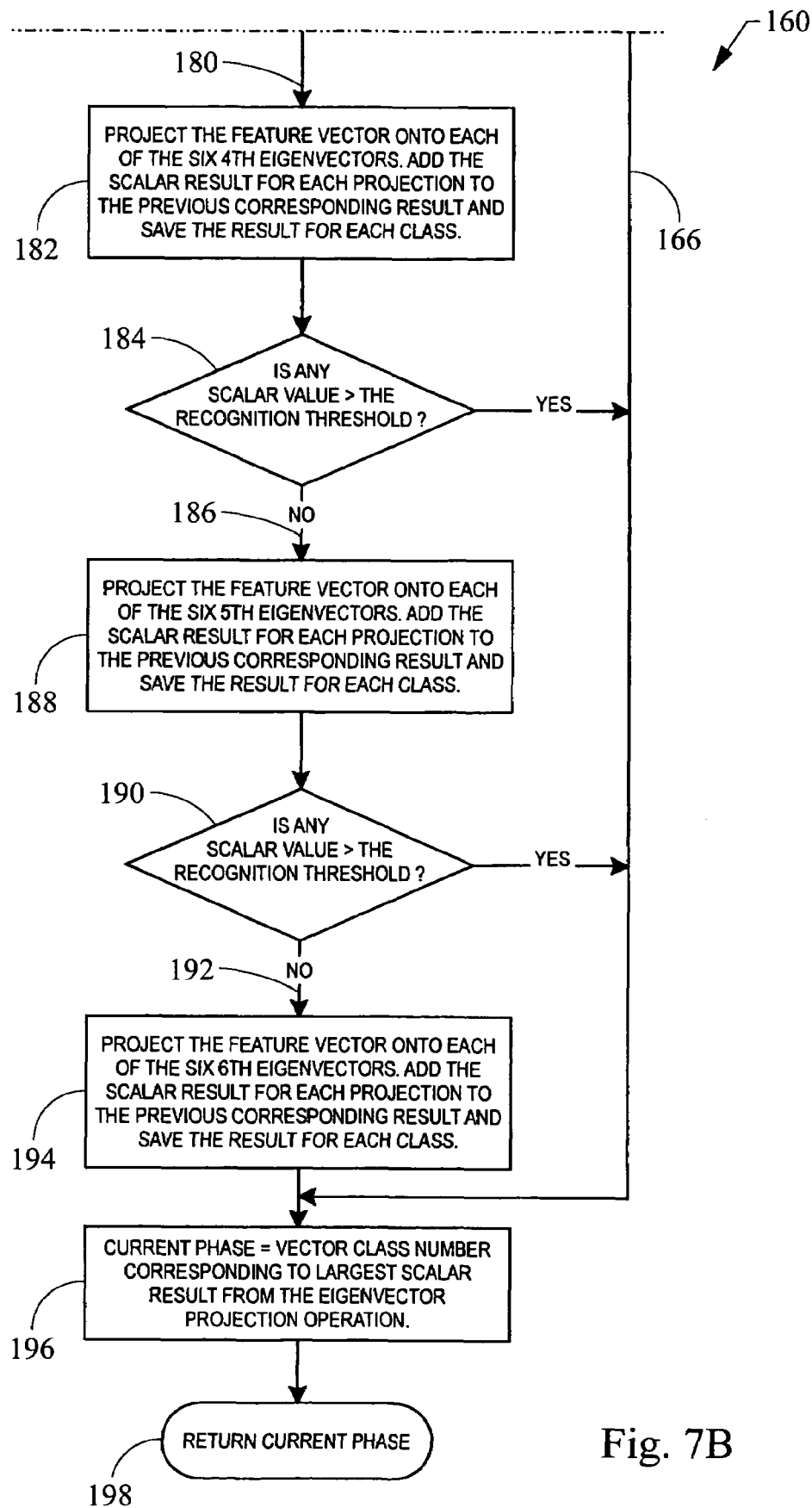

Now referring to FIG. 7, a method 160 is provided to identify missing pulses. Method 160 uses an autocorrelation subspace technique with eigenvector analysis to identify the missing pulses. In block 162, a feature vector is created using six consecutive pulse time periods. The feature vector is projected onto each of the $1^{st}$ eigenvectors of the subspace matrix of each of the six classes defining the prototype data base. The scalar result of each vector projection is squared and saved as the scalar result for each class. In block 164, the processor 14 determines if any of the scalar values saved for the $1^{st}$ projection for each class is greater than the recognition threshold. The recognition threshold can be defined differently for each of the following projection operations in order to optimize system recognition performance. As an example, the threshold would be exceeded if the recognized class normalized scalar result is greater than the value 0.85 and the next nearest class scalar result is a value more than 0.2 less than the recognized class value. If one of the scalar values is greater than the recognition threshold, then the logic flows along line 166 to block 196. If one of the scalar values is not greater than the recognition threshold, the logic flows along line 168 and the feature vector is projected onto each of the $2^{nd}$ eigenvectors of each of the six classes as denoted by block 170. The result of each projection is squared and this scalar result for each class is added to the corresponding first vector projection results and saved as the result for each corresponding class. In block 172, the processor determines if the scalar value result for any of the six classes is greater than the recognition threshold. If one of the results is greater than the recognition threshold, the logic flows along line 166 to block 196. If none of the scalar values for the six classes is greater than the recognition threshold, the logic flows along line 174 to block 176.

In block 176, the feature vector is projected onto each of the $3^{rd}$ eigenvectors of each of the six classes. The result of each projection is squared and this scalar result for each class is added to the corresponding $1^{st}$ and $2^{nd}$ vector projection results and saved as the result for each corresponding class. In block 178, the processor determines if the scalar value result for any of the six classes is greater than the recognition threshold. If one of the results is greater than the recognition threshold, the logic flows along line 166 to block 196. If none of the scalar values for the six classes is greater than the recognition threshold, the logic flows along line 180 to block 182.

In block 182, the feature vector is projected onto each of the six $4^{th}$ eigenvectors of each of the six classes. The result of each projection is squared and this scalar result for each class is added to the corresponding previously summed vector projection results and saved as the result for each corresponding class. In block 184, the processor determines if the scalar value result for any of the six classes is greater than the recognition threshold. If one of the results is greater than the recognition threshold, the logic flows along line 166 to block 196. If none of the scalar values for the six classes is greater than the recognition threshold, the logic flows along line 186 to block 188.

In block 188, the feature vector is projected onto each of the six $5^{th}$ eigenvectors of each of the six classes. The result of each projection is squared and this scalar result for each class is added to the corresponding previously summed vector projection results and saved as a result for each corresponding class. In block 190, the processor determines if the scalar value result for any of the six classes is greater than the recognition threshold. If one of the results is greater than the recognition threshold, the logic flows along line 166 to block 196. If none of the scalar values for the six classes is greater than the recognition threshold, the logic flows along line 192 to block 194.

In block 194 all classes are rejected since the $6^{th}$ eigenvector is not useful in successfully distinguishing between the six classes. All the summation results for each class are discarded and the process is repeated with new feature vector data.

Figure 8:
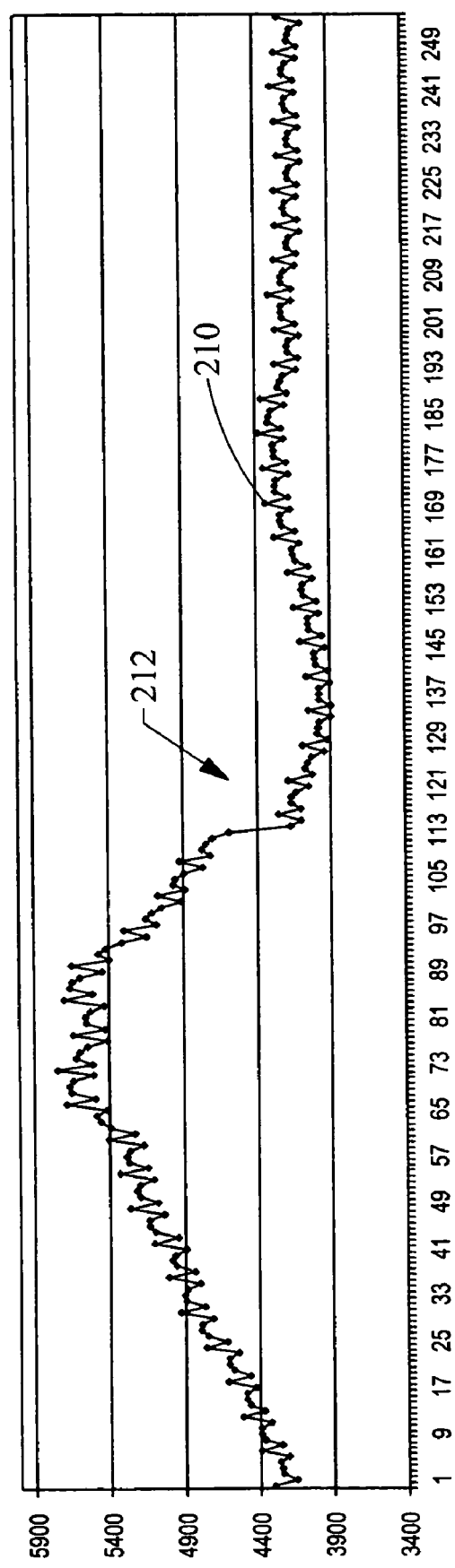
FIG. 8 is a graph illustrating variation in the pulse timing due to loads on the motor.

In block 198, the current phase is returned and the count is corrected based on the method 160. Although method 160 is very calculation intensive, it can be used where significant load fluctuations or signal interference will occur. One such scenario is provided in FIG. 8 where a signal 210 is shown illustrating a modulo 6 pulse signature and the signature is significantly distorted in a high torque region as denoted by reference numeral 212.

Figure 9:
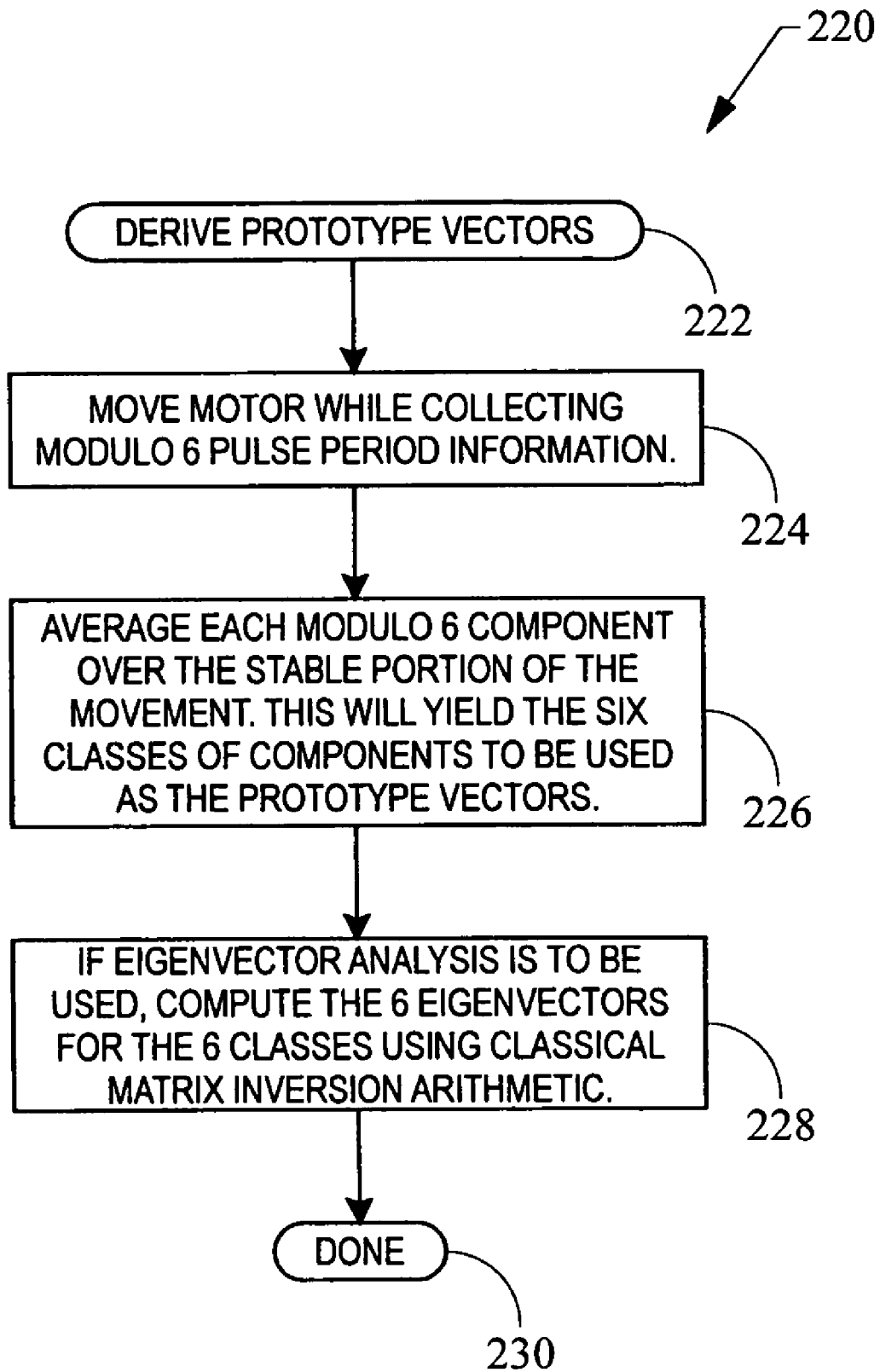
FIG. 9 is a flow chart illustrating a method for creating a pattern recognition template for the motor.

Now referring to FIG. 9, a method 220 is provided to derive the prototype vectors. The method starts in block 222 and in block 224 the pulses are collected and pulse period information is calculated while the motor is moved. The average of each phase component is calculated over a stable portion of the movement. This will yield the six classes of components to be used in the prototype vector, as denoted by block 226. In block 228, if the autocorrelation subspace technique using eigenvector analysis is to be used, the processor computes the six eigenvectors for each of the six classes. The six eigenvectors for each class may be calculated using classical linear algebra matrix arithmetic. The method 220 ends in block 230. The method 220 may be periodically performed over time to redefine or additively define the prototype vectors. Over time, wear of the motor 12 and the load caused by other components in the system may change the signal characteristics. Accordingly, the prototype vectors may be updated automatically over time to account for wear in the motor 12 or changes in the system environment. The prototype vectors may be re-derived based on certain intervals of time, a certain number of motor movements, or based on the quality of results of the pattern matching algorithm. Further, the signature quality of the motor 12 may be further improved by purposely offsetting commutators or magnetic fields in the motor 12 during its manufacture creating a form of index pulse or preplanned unique signature for the motor 12.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A system for drift compensation, the system comprising:
    a motor;
    a motor drive circuit in electrical communication with the motor and configured to provide a driving signal to the motor;
    a circuit in electrical communication with the motor and configured to generate pulses based on the motor commutation detected from the drive signal; and
    a processor configured to determine the time period between each of the pulses and detect a missing pulse based on the time periods, wherein the time periods form a signature and the processor detects the missing pulse based on the signature, and wherein the processor is configured to perform a pattern recognition on the signature to detect the missing pulse.

2. The system according to claim 1, wherein the processor is configured to detect missing pulses based on a pulse order relative to a thresholded minimum pulse time period.

3. The system according to claim 1, wherein the processor is configured to detect missing pulses based on a pulse order relative to a thresholded maximum pulse time period.

4. A system for drift compensation, the system comprising:
    a motor;
    a motor drive circuit in electrical communication with the motor and confined to provide a driving signal to the motor;
    a circuit in electrical communication with the motor and configured to generate pulses based on the motor commutation detected from the drive signal; and
    a processor configured to determine the time period between each of the pulses and detect a missing pulse based on the time periods, wherein the processor is configured to generate a feature vector based on the time periods and perform a comparison between the feature vector and a prototype vector to detect the missing pulse.

5. The system according to claim 4, wherein the processor performs a vector projection calculation using the feature vector and the prototype vector to detect the missing pulse.

6. The system according to claim 4, wherein the processor performs a best fit analysis to detect the missing pulse.

7. The system according to claim 4, wherein the processor performs an eigenvector analysis to detect missing pulses.

8. The system according to claim 4, wherein the processor is configured to automatically calculate the prototype vector.

9. The system according to claim 8, wherein the processor is configured to periodically recalculate the prototype vector.

10. The system according to claim 9, wherein the processor is configured to recalculate the prototype vector based on time.

11. The system according to claim 9, wherein the processor is configured to recalculate the prototype vector based on motor movement.

12. The system according to claim 9, wherein the processor is configured to recalculate the prototype vector based on the result of the comparison period.

13. A method for drift compensation, the method comprising:
    providing a drive signal to a motor;
    generating pulses based on motor communication detected from the drive signal;
    calculating a time period between each of the pulses; and
    detecting a missing pulse based on the time periods wherein the time periods form a signature and a pattern recognition is performed on the signature.

14. The method according to claim 13, performing a threshold on the time periods and determining the missing pulse based on a pulse order relative to a thresholded pulse time period.

15. The method according to claim 13, further comprising performing a comparison between a feature vector and a prototype vector.

16. The method according to claim 15, further comprising performing a vector projection between the feature vector and the prototype vector.

17. The method according to claim 15, wherein the processor is configured to automatically calculate the prototype vector.

18. The method according to claim 13, further comprising the step of correcting a drift of the motor based on the detected missing pulse.

* * * * *

UNITED STATES PATENT AND TRADEMARK OFFICE
CERTIFICATE OF CORRECTION

PATENT NO. : 7,190,129 B1  
APPLICATION NO. : 11/300127  
DATED : March 13, 2007  
INVENTOR(S) : Frank J. Haas Page 1 of 1

It is certified that error appears in the above-identified patent and that said Letters Patent is hereby corrected as shown below:

Column 7, line 49, Claim 4, "confined" should be --configured--.

Column 8, line 29, Claim 13, "communication" should be --commutation--.

Column 8, line 32, Claim 13, after "periods" insert --,--.

Signed and Sealed this

First Day of May, 2007

JON W. DUDAS  
*Director of the United States Patent and Trademark Office*